Jan. 21, 1969   R. E. BREITENGROSS   3,423,145
OPTICAL DEVICE FOR CAVITY INSPECTION
Filed Oct. 15, 1965
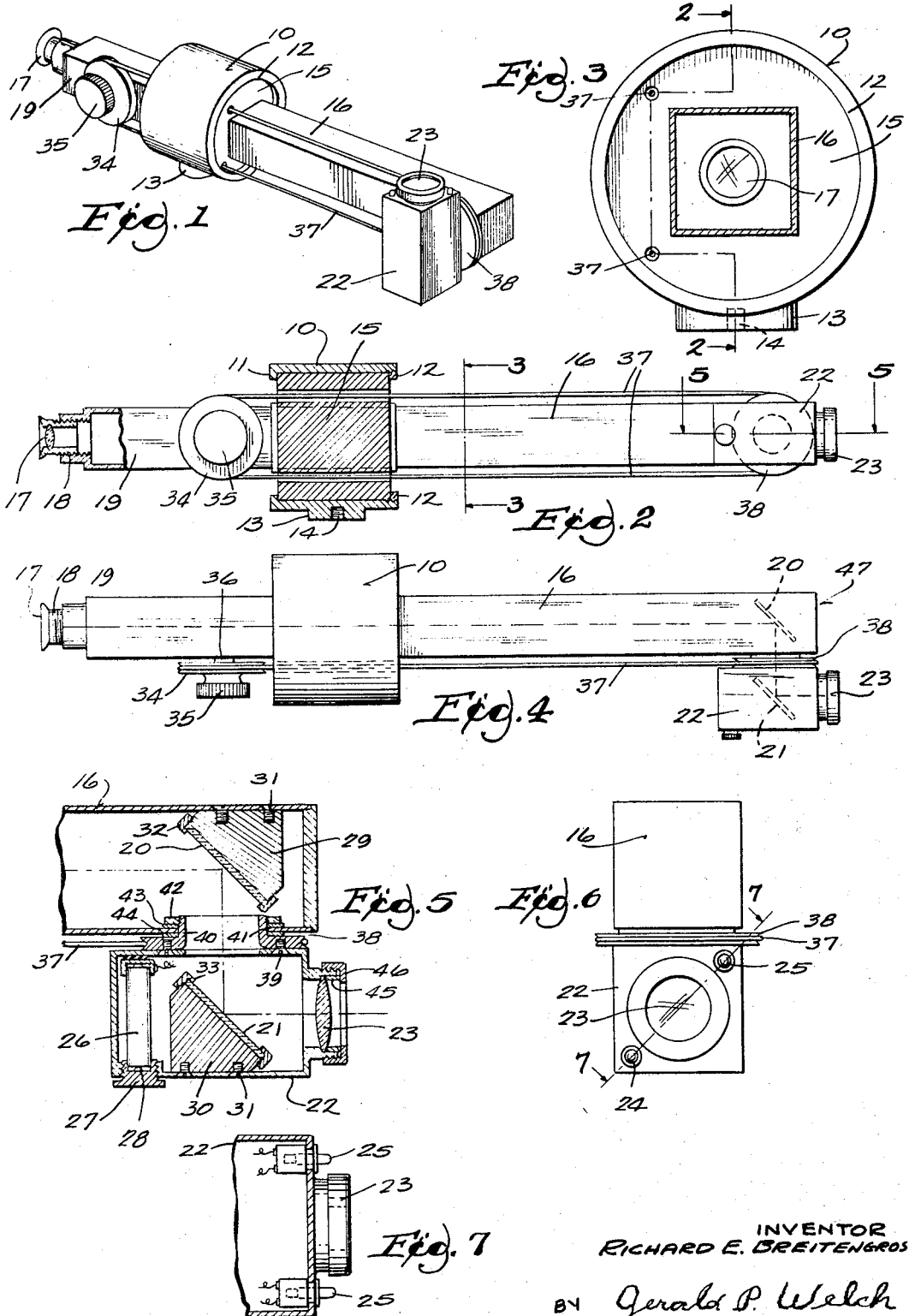
INVENTOR
RICHARD E. BREITENGROSS
BY Gerald P. Welch
ATTORNEY ized Jan. 21, 1969

United States Patent Office 3,423,145
Patented Jan. 21, 1969

3,423,145
OPTICAL DEVICE FOR CAVITY INSPECTION
Richard E. Breitengross, Neshkoro, Wis. 54960
Filed Oct. 15, 1965, Ser. No. 496,294
U.S. Cl. 350—24                                    1 Claim
Int. Cl. G02b 23/02

ABSTRACT OF THE DISCLOSURE

A swivel objective mounted on a rotatable tube having an eyepiece aligned with the objective and interconnected pulley means to rotate the objective with and relative to said tube.

---

This invention relates to optical devices, and more particularly to a novel optical device adapted for internal inspection of motors, machinery or the like.

An object of the invention is to provide a device of the type which may be inserted within the cavity of a motor or enclosed machine to provide visual inspection of the interior thereof.

Another object is to provide a device of the type which will be capable of viewing an interior completely with regard to any angle thereof.

Other and further objects of the invention will appear as the description proceeds, reference being had to the accompanying drawing, in which:

FIG. 1 is a perspective view of an optical device embodying the invention.

FIG. 2 is a cross-sectional view taken on line 2—2 of FIG. 3.

FIG. 3 is a vertical sectional view taken on line 3—3 of FIG. 2.

FIG. 4 is a plan view of the device.

FIG. 5 is a fragmentary vertical sectional view on line 5—5 of FIG. 2.

FIG. 6 is an end view in elevation of the device.

FIG. 7 is a fragmentary cross-sectional view taken on line 7—7 of FIG. 6.

Referring more particularly to the drawing, the numeral 10 refers to a circular base member having the inwardly directed flanges 11 and 12, and a boss at 13 provided with a threaded aperture at 14 to provide for use with a tripod or the like. A core 15 is rotatable within the base member 10 and carries within it the elongated tube 16. An eyepiece 17 with threaded adjustment means 18 is provided at one end 19 opposite an angled mirror at 20 which in turn sights an inclined mirror 21 in the rotatable scope 22 fitted with a lens 23.

Adjoining the lens 23, as shown in FIG. 6, are a pair of miniature electric bulbs 24 and 25, powered by a battery 26, which may be replaced by removing the knurled knob 27, which also contains a contact 28 for said battery. Mirrors 20 and 21 are mounted on blocks 29 and 30 by means of screws 31 and frame elements 32 and 33.

Exteriorly of the tube 16 is a pulley 34, mounted with a knurled knob 35 on a rotatable pin 36. A cord 37 connects the pulley 34 with a driven pulley 38, fixed by threaded means 39 to the rotatable scope 22. The pulley 38 has an integral flange 40 which extends through an aperture at 41 of the tube 16, and is held rotatably in place by the internally threaded ring 42, together with the washers 43 and 44. The lens 23 is held in place by the ring element 45 and the threaded ring cap 46.

In use, the device may be employed with or without a tripod, and the end 47 provided with the rotatable scope 22 may be inserted interiorly of a motor or machine or any body desired to be inspected. The scope 22 by its own rotation and by means of the rotation of tube 16 will permit aiming of the lens 23 at any part of the interior of said body, and the light means will facilitate a visual examination thereof.

It will be understood that the device is capable of many modifications in structure and design, without departing from the spirit of the invention, within the scope of the appended claim.

Having thus described the invention, what is claimed and desired to be secured by Letters Patent of the United States is:

1. A device for inspecting interiors of structures including a circular base portion, a first tube rotatable on its optical axis therein, an eyepiece aligned on said optical axis and attached to one end of said first tube, a relatively short objective second tube extending laterally from said first tube at the end opposite from said eyepiece and pivotally connected thereto, a lens located on the optical axis and attached to one end of the objective tube, a reflecting mirror angularly disposed to the optical axis and attached to said first tube at the end opposite said eyepiece, a second reflecting mirror angularly disposed to and optically aligned with said first mirror and attached to said objective second tube, a pair of lights oppositely and exteriorly disposed adjacent the periphery of said lens, a pulley mounted laterally adjacent said eyepiece on said first tube, a knurled knob integral with said pulley for manipulation thereof, a second pulley mounted on said objective second tube, and an endless cord connecting said two pulleys for rotation of said objective tube and lens on an axis perpendicular to the axis of said tube.

References Cited

UNITED STATES PATENTS

| 1,607,688 | 11/1926 | Perrin et al. | 350—22 |
| 1,945,380 | 1/1934 | Russell. | |
| 2,182,651 | 5/1939 | Wilson et al. | 350—25 |
| 2,363,701 | 11/1944 | Soetbeer | 350—25 X |
| 2,437,458 | 3/1948 | Crampton | 350—24 |
| 2,968,208 | 1/1961 | Shaw | 350—52 |
| 2,507,935 | 5/1950 | Richmond | 350—80 X |

FOREIGN PATENTS

| 1,285,160 | 1/1962 | France. |
| 489,166 | 7/1938 | Great Britain. |

DAVID SCHONBERG, *Primary Examiner.*

P. R. GILLIAM, *Assistant Examiner.*

U.S. Cl. X.R.
350—25, 52, 80, 49